(12) United States Patent
Towns et al.

(10) Patent No.: US 8,945,432 B2
(45) Date of Patent: Feb. 3, 2015

(54) CONDUCTIVE POLYMER COMPOSITIONS IN OPTO-ELECTRICAL DEVICES

(75) Inventors: Carl R. Towns, Cambridgeshire (GB); Caroline Towns, legal representative, Cambridgeshire (GB); Andrew Bruce Holmes, Parkville (AU); Mary J. McKiernan, Cambridgeshire (GB)

(73) Assignees: Cambridge Display Technology Limited, Cambridgeshire (GB); CDT Oxford Limited, Cambridgeshire (GB)

( * ) Notice: Subject to any disclaimer, the term of this patent is extended or adjusted under 35 U.S.C. 154(b) by 1664 days.

(21) Appl. No.: 11/813,094

(22) PCT Filed: Dec. 23, 2005

(86) PCT No.: PCT/GB2005/005061
§ 371 (c)(1),
(2), (4) Date: Jul. 16, 2009

(87) PCT Pub. No.: WO2006/070186
PCT Pub. Date: Jul. 6, 2006

(65) Prior Publication Data
US 2010/0025703 A1 Feb. 4, 2010

(30) Foreign Application Priority Data
Dec. 29, 2004 (GB) .................. 0428444.4

(51) Int. Cl.
| | | |
|---|---|---|
| *H01B 1/06* | (2006.01) | |
| *H01B 1/24* | (2006.01) | |
| *H01B 1/12* | (2006.01) | |
| *C08L 65/00* | (2006.01) | |
| *C09D 11/30* | (2014.01) | |
| *C08L 71/02* | (2006.01) | |

(52) U.S. Cl.
CPC ................ *H01B 1/127* (2013.01); *C08L 65/00* (2013.01); *C09D 11/30* (2013.01); *H01B 1/122* (2013.01); *C08L 71/02* (2013.01)
USPC ........ 252/511; 29/623.5; 428/195.1; 429/303

(58) Field of Classification Search
USPC ......... 252/511; 428/195.1; 29/623.5; 525/92; 429/303
See application file for complete search history.

(56) References Cited

U.S. PATENT DOCUMENTS

| | | |
|---|---|---|
| 4,539,507 A | 9/1985 | VanSlyke et al. |
| 5,150,006 A | 9/1992 | Van Slyke et al. |
| 5,432,014 A | 7/1995 | Sano et al. |

(Continued)

FOREIGN PATENT DOCUMENTS

| | | |
|---|---|---|
| DE | 101 23 115 A1 | 11/2002 |
| EP | 0 686 662 | 12/1995 |
| EP | 0 707 020 | 4/1996 |
| EP | 0 842 208 | 5/1998 |

(Continued)

OTHER PUBLICATIONS

Cao et al., "Efficient, Fast Response Light-Emitting Electrochemical Cells: Electroluminescent and Solid Electrolyte Polymers with Interpenetrating Network Morphology," *Appl. Phys. Letts.*, 68(23):3218-3220 (1996).

(Continued)

*Primary Examiner* — Khanh Tuan Nguyen
(74) *Attorney, Agent, or Firm* — Marshall, Gerstein & Borun LLP

(57) ABSTRACT

A conductive polymer composition comprising a conductive polymer in a solid polyelectrolyte.

35 Claims, 3 Drawing Sheets

(56) References Cited

U.S. PATENT DOCUMENTS

| | | | |
|---|---|---|---|
| 5,599,355 A * | 2/1997 | Nagasubramanian et al. | ............................ 29/623.5 |
| 5,621,131 A | 4/1997 | Kreuder et al. | |
| 5,795,942 A | 8/1998 | Rhee et al. | |
| 6,083,634 A | 7/2000 | Shi | |
| 6,268,695 B1 | 7/2001 | Affinito | |
| 6,353,083 B1 | 3/2002 | Inbasekaran et al. | |
| 6,537,468 B1 * | 3/2003 | Hata et al. | ..................... 252/511 |
| 6,953,628 B2 | 10/2005 | Kamatani et al. | |
| 7,030,138 B2 | 4/2006 | Fujimoto et al. | |
| 7,094,477 B2 | 8/2006 | Kamatani et al. | |
| 7,125,998 B2 | 10/2006 | Stossel et al. | |
| 7,147,935 B2 | 12/2006 | Kamatani et al. | |
| 7,238,435 B2 | 7/2007 | Kamatani et al. | |
| 7,781,047 B2 * | 8/2010 | Majumdar et al. | ......... 428/195.1 |
| 2002/0117662 A1 | 8/2002 | Nii | |
| 2002/0182441 A1 | 12/2002 | Lamansky et al. | |
| 2003/0010959 A1 | 1/2003 | Lee et al. | |
| 2004/0171752 A1 * | 9/2004 | Nieminen | ................... 525/92 A |

FOREIGN PATENT DOCUMENTS

| | | | |
|---|---|---|---|
| EP | 0 880 303 | | 11/1998 |
| EP | 0 949 850 | | 10/1999 |
| EP | 1 081 549 | A | 3/2001 |
| EP | 1 245 659 | A1 | 10/2002 |
| GB | 2 336 553 | A | 10/1999 |
| GB | 2 348 316 | | 9/2000 |
| JP | 62-285954 | * | 12/1987 ............ C08L 101/00 |
| JP | 2002-324679 | | 11/2002 |
| JP | 2004-327829 | | 11/2004 |
| KR | 2002-0087600 | | 11/2002 |
| WO | WO-90/13148 | A1 | 11/1990 |
| WO | WO-98/10621 | | 3/1998 |
| WO | WO 98/57381 | | 12/1998 |
| WO | WO 99/48160 | | 9/1999 |
| WO | WO-00/48258 | | 8/2000 |
| WO | WO-00/53656 | A1 | 9/2000 |
| WO | WO-00/55927 | A1 | 9/2000 |
| WO | WO-01/19142 | | 3/2001 |
| WO | WO-01/62869 | | 8/2001 |
| WO | WO-01/81649 | | 11/2001 |
| WO | WO-02/31896 | | 4/2002 |
| WO | WO-02/44189 | | 6/2002 |
| WO | WO-02/45466 | | 6/2002 |
| WO | WO-02/066552 | | 8/2002 |
| WO | WO-02/068435 | | 9/2002 |
| WO | WO-02/081448 | | 10/2002 |
| WO | WO-02/084759 | | 10/2002 |
| WO | WO-03/000765 | | 1/2003 |
| WO | WO-03/022908 | | 3/2003 |
| WO | WO-03/018653 | | 6/2003 |
| WO | WO-2004/029128 | | 4/2004 |

OTHER PUBLICATIONS

Chen et al., "Recent Developments in Molecular Organic Electroluminescent Materials," *Marcomol. Symp.*, 125:1-48 (1997).

Chen et al., "Triplet Exciton Confinement in Phosphorescent Polymer Light-Emitting Diodes," *Appl. Phys. Letts.*, 82(7):1006-1008 (2003).

Cleave et al., "Harvesting Singlet and Triplet Energy in Polymer LEDs," *Adv. Mat.*, 11(4):285-288 (1999).

Duineveld et al., "Ink-Jet Printing of Polymer Light-Emitting Devices," *Proceedings of SPIE*, 4464 (2002).

Hebner et al., "Ink-Jet Printing of Doped Polymers for Organic Light Emitting Devices," *Appl. Phys. Letts.*, 72(5):519-521 (1998).

Ikai et al., "Highly Efficient Phosphorescence from Organic Light-Emitting Devices with an Exciton-Block Layer," *Appl. Phys. Letts.*, 79(2)): 156-158 (2001).

Lane et al., "Origin of Electrophosphorescence from a Doped Polymer Light Emitting Diode," *Phys. Rev. B*, 63:235206-235214 (2001).

Lee et al., "Polymer Phosphorescent Light-Emitting Devices Doped with Tris(2-phenylpyridine) Iridium as a Triplet Emitter," *Appl. Phys. Letts.*, 77(15):2280-2282 (2000).

Niu et al., "Thermal Annealing Below the Glass Transition Temperature: A General Way to Increase Performance of Light-Emitting Diodes Based on Copolyfluorenes," *Appl. Phys. Letts.*, 81(4):634-636 (2002).

O'Brien et al., "Electrophosphoresence from a Doped Polymer Light Emitting Diode," *Synth. Met.*, 116:379-383 (2001).

Setayesh et al., "Bridging the Gap Between Polyfluorene and Ladder-Poly-*p*-phenylene: Synthesis and Characterization of Poly-2,8-indenofluorene," *Macromolecules*, 33(6):2016-2020 (2000).

Yamaguchi et al., "Effects of B and C on the Ordering of $L1_0$-CoPt Thin Films," *Appl. Phys. Letts.*, 79(13):2001-2003 (2001).

Yamamoto, "Electrically Conducting and Thermally Stable π-Conjugated Poly(arylene)s Prepared by Organometallic Processes," *Progress in Polymer Science*, 17:1153-1205 (1993).

Yang et al., "Efficient Blue Polymer Light-Emitting Diodes from a Series of Soluble Poly(paraphenylene)s," *J. Appl. Phys.*, 79(2):934-939 (1996).

Yang, "Polymer Light-Emitting Logos Processed by the Ink-Jet Printing Technology," *SPIE Photonics West: Optoelectronics*, Conf. 3279:78-86 (1998).

Zhu et al., "Synthesis of New Iridium Complexes and Their Electrophosphorescent Properties in Polymer Light-Emitting Diodes," *J. Mater. Chem.*, 13:50-55 (2003).

Combined Search and Examination Report for Application No. GB0428444.4, dated May 31, 2005.

International Preliminary Report on Patentability for International Application No. PCT/GB2005/005061, dated Jul. 3, 2007.

International Search Report for International Application No. PCT/GB2005/005061, dated Apr. 28, 2006.

Written Opinion for International Application No. PCT/GB2005/005061, dated Apr. 28, 2006.

* cited by examiner

CONDUCTIVE POLYMER COMPOSITIONS IN OPTO-ELECTRICAL DEVICES

FIELD OF INVENTION

This invention relates to conductive polymer compositions and opto-electrical devices comprising conductive polymer compositions.

BACKGROUND OF INVENTION

One class of opto-electrical devices is that using an organic material for light emission or detection. The basic structure of these devices is a light emissive organic layer, for instance a film of a poly (p-phenylenevinylene) ("PPV") or polyfluorene, sandwiched between a cathode for injecting negative charge carriers (electrons) and an anode for injecting positive charge carriers (holes) into the organic layer. The electrons and holes combine in the organic layer generating photons. In WO90/13148 the organic light-emissive material is a polymer. In U.S. Pat. No. 4,539,507 the organic light-emissive material is of the class known as small molecule materials, such as (8-hydroxyquinoline)aluminium ("Alq3"). In a practical device one of the electrodes is transparent, to allow the photons to escape the device.

A typical organic light-emissive device ("OLED") is fabricated on a glass or plastic substrate coated with a transparent anode such as indium-tin-oxide ("ITO"). A layer of a thin film of at least one electroluminescent organic material covers the first electrode. Finally, a cathode covers the layer of electroluminescent organic material. The cathode is typically a metal or alloy and may comprise a single layer, such as aluminium, or a plurality of layers such as calcium and aluminium.

In operation, holes are injected into the device through the anode and electrons are injected into the device through the cathode. The holes and electrons combine in the organic electroluminescent layer to form an exciton which then undergoes radiative decay to give light.

These devices have great potential for displays. However, there are several significant problems. One is to make the device efficient, particularly as measured by its external power efficiency and its external quantum efficiency. Another is to optimise (e.g. to reduce) the voltage at which peak efficiency is obtained. Another is to stabilise the voltage characteristics of the device over time. Another is to increase the lifetime of the device.

To this end, numerous modifications have been made to the basic device structure described above in order to solve one or more of these problems.

One such modification is the provision of a layer of conductive polymer between the light-emissive organic layer and one of the electrodes. It has been found that the provision of such a conductive polymer layer can improve the turn-on voltage, the brightness of the device at low voltage, the efficiency, the lifetime and the stability of the device. In order to achieve these benefits these conductive polymer layers typically may have a sheet resistance less than $10^6$ Ohms/square, the conductivity being controllable by doping of the polymer layer. It may be advantageous in some device arrangements to not have too high a conductivity. For example, if a plurality of electrodes are provided in a device but only one continuous layer of conductive polymer extending over all the electrodes, then too high a conductivity can lead to lateral conduction and shorting between electrodes.

The conductive polymer layer may also be selected to have a suitable workfunction so as to aid in hole or electron injection and/or to block holes or electrons. There are thus two key electrical features: the overall conductivity of the polymer composition; and the workfunction of the polymer composition. The stability of the composition and reactivity with other components in a device will also be critical in providing an acceptable lifetime for a practical device. The processability of the composition will be critical for ease of manufacture.

One example of a suitable conductive polymer for use as a hole injection layer between the anode and the light-emissive organic layer is polystyrene sulphonic acid doped polyethylene dioxythiophene ("PEDOT-PSS")—see EP 0,686,662. This composition provides an intermediate ionisation potential (intermediate between the ionisation potential of the anode and that of the emitter) a little above 4.8 eV, which helps the holes injected from the anode to reach the HOMO level of a material, such as an organic light emissive material or hole transporting material, in an adjacent layer of an opto-electrical device. The PEDOT-PSS may also contain epoxysilane to produce cross-linking so as to provide a more robust layer. Typically the thickness of the PEDOT/PSS layer in a device is around 50 nm. The conductance of the layer is dependent on the thickness of the layer.

The chemical structures for PEDOT and PSS are shown in formulae 1 to 4 below:

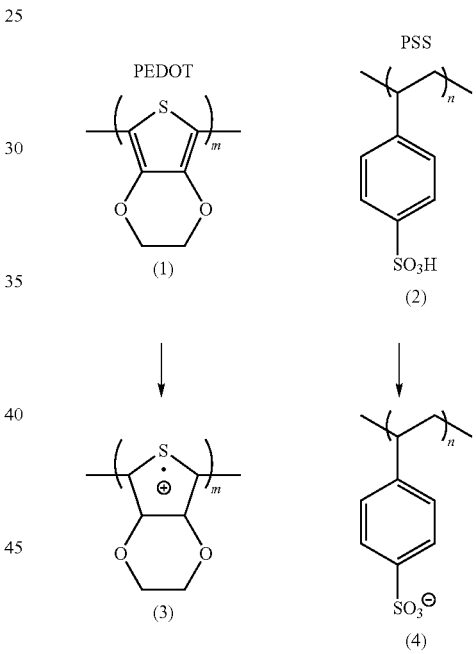

In a PEDOT-PSS composition the PEDOT oxidises to produce a polymer radical cation which acts as a hole transporter. The PSS ionises to produce a polymer anion which acts as a counter ion to stabilise the charge on the PEDOT. Previously small counter ions had been used for stabilizing the charge on the PEDOT. However, it was found that small counter ions migrated though the system when subjected to an electromagnetic field causing charge separation and charge build up in localized areas/interfaces of a device resulting in poor performance. Migration of the counter ion can also lead to adverse reactions with materials in adjacent layers. Larger counter ions, for example polymeric counter ions such as PSS, are found to be advantageous as they do not diffuse through an opto-electronic device when the device is switched on.

PEDOT:PSS is water soluble and therefore solution processible. The provision of PEDOT:PSS between an ITO anode and an emissive layer increases hole injection from the ITO to the emissive layer, planarises the ITO anode surface, preventing local shorting currents and effectively makes energy difference for charge injection the same across the surface of the anode.

It has been found that varying the ratio of PEDOT:PSS in a layer of a device significantly changes the functional performance of the device.

A PEDOT:PSS ratio of 1:2.5 provides a stable processible solution. That is, materials with this ratio or higher PSS stay in solution. At low concentrations they come out of solution. Without being bound by theory, it is thought that the PEDOT radical cations are stabilized in solution as a result of the sulphonate counter ions surrounding the PEDOT radical cations and forming micel type structures. The sulphonate counter ions are more hydrophilic than the PEDOT radical cations and aid in forming a suspension of the PEDOT radical cations. As a result longer chain (higher molecular weight) PEDOT molecules can be formed during polymerisation without falling out of solution. Further, longer chain PEDOT molecules are easier to oxidize and produce better hole transport. Therefore, the sulphonate counterions aid hole transport by stabilising the PEDOT radical cations. However, at a ratio of 1:2.5 the conductivity is very high and as such this material cannot be used in some opto-electronic device arrangements as it can, for example, short connections between electrode lines in a device as discussed previously.

In practice, it has been found that using an excess of PSS can improve device performance and, in particular, can increase lifetime. Furthermore, excess PSS results in the composition being easier to ink jet print. By "excess PSS" is meant more PSS than is needed to prevent the PEDOT falling out of solution. Thus, using excess PSS, such as a PEDOT:PSS ratio of 1:20 is useful in working devices. Without wishing to be bound by theory the present inventors propose several explanations for the improved device performance that is observed when using an excess of PSS. The first of these relates to conductivity.

The PSS content affects the conductivity of the composition. In this regard, the present applicants consider that there are two types of conduction important for providing good hole transport: ionic conduction (e.g. by $H^+$ ions); and radical cation (hole) conduction (e.g. via PEDOT). Without wishing to be bound by theory, the applicants believe that the excess PSS contributes to both types of conduction. It appears that the hydrogen ions contribute to the conductivity of the composition via ionic conduction. Further, as discussed above, the sulphonate stabilizes the PEDOT radical cation to aid hole transport. The former effect (ionic conductivity) will be dependent on the amount of PSS, with a large excess increasing ionic conductivity. The latter effect (hole conductivity) will not be as sensitive to the amount of PSS present as the effect will saturate when sufficient PSS is present to stabilize the radical cation.

Another possible mechanism to explain the improvement in device performance when using excess PSS is that the PSS is more hydrophilic than the PEDOT. Accordingly, excess PSS increases film uniformity with an adjacent polymer layer as the excess PSS results in the composition being more hydrophilic causing less mixing with the adjacent polymer layer.

It is evident from the above that it is advantageous to provide PSS in excess for ease of manufacture of a device and so as to produce a device with better performance and lifetime. However, there is always a desire to further improve the performance and lifetime of devices and make the manufacturing process easier and cheaper. Accordingly, alternatives to the PEDOT-PSS system having excess PSS are sort. Without being bound by theory, one possible limitation on the lifetime of devices using the aforementioned PEDOT-PSS system is that the provision of such a large excess of PSS results in a composition which is very acidic. This may cause several problems. For example, providing a high concentration of strong acid in contact with ITO may cause etching of the ITO with the release of indium, tin and oxygen components into the PEDOT which degrades the overlying light emitting polymer. Furthermore, the acid may interact with light emitting polymers resulting in charge separation which is detrimental to device performance.

Since PEDOT:PSS is solution processible, it is desirable to also enable the deposition of PEDOT:PSS and alternatives thereof according to the present invention using ink jet printing techniques. The key reasons for the interest in ink jet printing are scalability and adaptability. The former allows arbitrarily large sized substrates to be patterned and the latter should mean that there are negligible tooling costs associated with changing from one product to another since the image of dots printed on a substrate is defined by software.

The deposition of material for organic light emitting diodes (OLEDs) using ink jet printing techniques are described in a number of documents including, for example: T. R. Hebner, C. C. Wu, D. Marcy, M. H. Lu and J. C. Sturm, "Ink-jet Printing of doped Polymers for Organic Light Emitting Devices", *Applied Physics Letters*, Vol. 72, No. 5, pp. 519-521, 1998; Y. Yang, "Review of Recent Progress on Polymer Electroluminescent Devices," *SPIE Photonics West: Optoelectronics '98*, Conf. 3279, San Jose, Jan., 1998; EP O 880 303; and "Ink-Jet Printing of Polymer Light-Emitting Devices", Paul C. Duineveld, Margreet M. de Kok, Michael Buechel, Aad H. Sempel, Kees A. H. Mutsaers, Peter van de Weijer, Ivo G. J. Camps, Ton J. M. van den Biggelaar, Jan-Eric J. M. Rubingh and Eliav I. Haskal, Organic Light-Emitting Materials and Devices V, Zakya H. Kafafi, Editor, Proceedings of SPIE Vol. 4464 (2002). Ink jet techniques can be used to deposit materials for both small molecule and polymer LEDs.

A volatile solvent is generally employed to deposit organic electronic material, with 0.5% to 4% dissolved material. This can take anything between a few seconds and a few minutes to dry and results in a relatively thin film in comparison with the initial "ink" volume. Often multiple drops are deposited, preferably before drying begins, to provide sufficient thickness of dry material. Precision ink jet printers such as machines from Litrex Corporation of California, USA are used; suitable print heads are available from Xaar of Cambridge, UK and Spectra, Inc. of NH, USA.

Accordingly, there is a desire to provide an alternative to the aforementioned system, preferably one which results in better device performance, lifetime and ease of manufacture.

It is an aim of the present invention is to solve one or more of the problems outlined above.

SUMMARY OF INVENTION

According to a first aspect of the present invention there is provided a conductive polymer composition comprising a conductive polymer in a solid polyelectrolyte.

The conductive polymer may comprise a doped polymer.

Preferably, the conductive polymer comprises a conductive polymer ion and the conductive polymer composition further comprises a counter ion. Conductive polymer ions have been found to be good conductors and the counter ions aid in stabilizing the conductive polymer ions.

Preferably, the counter ion is a polymer. This prevents the counter ion from diffusing though the device in use. It is advantageous for the counter ion to remain in a position for stabilizing the conductive polymer ion. This will aid conduction.

Preferably, the conductive polymer ion is a cation and the counter ion is an anion. Conductive polymer cations have been found to be useful as hole transporters. However, it is envisaged that the conductive polymer composition may be used as an electron transporter in which case the polarity of the system may be reversed.

Preferably the counter ion is an anion of a compound with a high dissociation constant, such that the compound effectively is completely ionised. Examples of compounds with a high dissociation constant include a strong acid and a salt. However, the counter ion is not so limited and the counter ion may be the anion or cation of a compound having a lower dissociation constant, such that the compound is not completely ionised, or the cation of a compound with a high dissociation constant. The counter ion may be an anion of polystyrene sulphonic acid. The conductive polymer ion may be a cation of polyethylene dioxythiophene.

Support for the use of a salt rather than an acid as the source of counter ions and conductive ions is provided by the following experiments by the present applicants.

First, the hydrogen in the PSS was replaced with a large cation (a quaternary ammonium salt Q$^+$) giving the structure shown below:

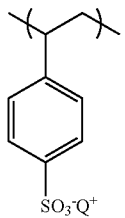

(5)

It was found that replacement of the hydrogen ions in PSS with large ions results in a large drop in conductivity. Secondly, the hydrogen in the PSS was replaced with a small cation (Na$^+$). It was found that replacement of the hydrogen ions in PSS with another small ion such as Na$^+$ using NaOH does not result in such a large drop in conductivity. This suggests that the cations are participating in ionic conduction with smaller ions being more mobile. Accordingly, it is apparent that a salt (or other compound that dissociates) could be used in place of the acid, with the size of the cation (or anion for an electron injector) and/or the dissociation constant of the salt or other compound being selected according to the amount of ionic conductance required.

It is to be noted that in the second experiment discussed above some drop in performance was observed when the hydrogen ions in PSS were replaced with Na$^+$ using NaOH over and above that expected for any reduction in mobility of the counter ion. Without being bound by theory, the present inventors think that the OH$^-$ ions from the NaOH interact with the PEDOT radical cation and inhibit hole transport. Accordingly, it is considered that if the amount of NaOH is reduced (e.g. so that the acid is only partially neutralized) then the Na$^+$ ions will be able to participate in ionic conductance and the amount of OH$^-$ ions will not be so high as to inhibit hole transport. Accordingly, a combination of an acid and a base may be used as a source of the counter ions and conducting ions. The acid and/or base may only be partially neutralized in order to avoid adverse side effects on the radical ion conductance.

The ratio of conductive polymer ion: counter ion may be less than 1:10, preferably less than 1:5, more preferably less than 1:2.5 or even less than 1:2.

Preferably, the conductive polymer and/or the solid polyelectrolyte are soluble in water. This allows for easy solution processing of the composition.

Preferably, the solid polyelectrolyte comprises a polymer matrix and ions. These ions can be from a salt or an acid, for example. Preferably, the ions are ions of a species with a high dissociation constant. The dissociation constant may be selected to tune conductivity. The ions can diffuse through the polymer matrix to provide ionic conductance. The matrix and the ions can be selected to tune conductivity. In the embodiment where the conductive polymer comprises a doped polymer, the dopant may comprise the ions. That is, in forming a conductive polymer using a dopant, ions may be inevitably formed which can participate in ionic conductance. Alternatively, or additionally, in forming a counter ion to stabilize a conductive polymer ions may be inevitably formed which can participate in ionic conductance.

Preferably, the salt is soluble in water.

The salt may be any metal salt including group 1 metals, group 2 metals, d-block metals, lanthanides and actinides. However, it is preferable that the cation is small and the anion is large. Accordingly, preferred salts are those of group 1 metals and groups 2 metals, preferably sodium or lithium, with lithium being the most preferred. Examples of lithium salts are lithium halides and lithium triflimide, the formula of which is shown below:

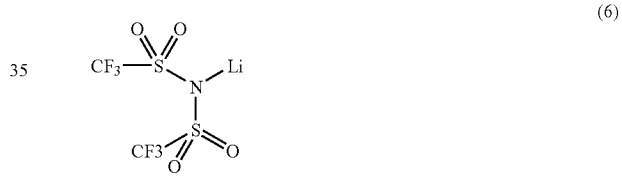

(6)

The salt may be composed of a small cation and a large anion such that the mobility of the cation is large while the mobility of the anion is small. This allows for a suitable level of ionic conductivity via the cation while preventing the anion from diffusing towards an anode in a device which may adversely affect the performance of the device. In particular, by effectively anchoring the anions, the cations will be pulled back towards their starting position when the device is switched off preventing salt migration and localisation in a device over time.

Preferably, the polymer matrix is crosslinked. A cross-linked matrix is advantageous for preventing diffusion of undesirable species in the device. Further, a cross-linked matrix is advantageous for preventing diffusion of the anion comprised in the salt in the device. Where a cross-linked matrix is used, the anion need not be large. Furthermore, cross-linking can make the layer more robust and allows another layer to be deposited thereon without dissolution and mixing of the layers. A preferred example of a solid polyelectrolyte comprises polyethylene glycol. Other alternatives may include organic ion exchange membranes, polypyrroles, polymeric acids and quaternised polypyridines and polyamines, and polymeric salts of amines.

Preferably the conductive polymer has a work function less than or equal to 5.5 eV, more preferably in the range 4.8-5.5 eV. This allows for good hole injection from the anode into an adjacent semi-conductive hole transporter and/or emitter.

According to another aspect of the present invention there is provided an electrical device, preferably an opto-electronic device, comprising a conductive polymer composition as described herein. Preferably the electrical device comprises an anode, a cathode, and an organic semi-conductive layer between the anode and cathode. The conductive polymer composition may be provided in a layer between the anode and cathode. When the conductive polymer composition is used as a hole injection material, the layer comprising the conductive polymer composition is preferably located between the anode and the organic semi-conductive layer. When the conductive polymer composition is used as an electron transport material, the layer comprising the conductive polymer composition is preferably located between the cathode and the organic semi-conductive layer or in the organic semi-conductive layer. The organic semi-conductive layer preferably is light-emissive. The anode preferably comprises ITO.

The organic semi-conductive layer may comprise one or more of a hole transporter, an electron transporter and a light emissive material. One or more further organic semi-conductive layers may be provided between the anode and cathode. One or both of the anode and cathode independently may comprise the conductive polymer composition.

According to another aspect of the present invention there is provided a method of manufacturing an electrical device as described herein, wherein the conductive polymer composition is deposited by spin coating or ink jet printing. The conductive polymer composition may be deposited in an aqueous solution. The composition may be heated after being deposited so as to cross-link the polyelectrolyte. This heating step may be performed prior to deposition of an overlying layer.

The present invention provides an alternative to the provision of excess strong acid in known conductive polymer compositions. In particular, embodiments of the present invention provide an alternative to the provision of PEDOT-PSS formulations having excess PSS known in the art and in some cases the whole PEDOT-PSS system can be replaced.

According to some embodiments of the present invention only the excess PSS in PEDOT-PSS is replaced with a solid polyelectrolyte, the conductivity of which can be tuned (by suitable choice of host and ionic salt type and concentration). This may reduce the rate of degradation of a device due to a reduction in the PSS concentration.

In one embodiment PEDOT, PSS and cross-linkable polyethylene glycol are synthesised together from their monomers in aqueous solution with an ionic dopant (the salt). In another embodiment, PEDOT:PSS is synthesised in a solution containing cross-linkable polyethylene glycol and an ionic dopant. In still another embodiment, PEDOT:PSS is synthesised and subsequently mixed with cross-linkable polyethylene glycol and an ionic dopant.

A low PEDOT:PSS ratio of approximately 1:2.5 may be used. However, it is envisaged that lower concentrations (less than 1:2.5, less than 1:2.0, less than 1:1.5 or even as low as 1:1.2 or lower) are enabled because the solution processability of the system will be altered because of the presence of the polyethylene glycol. The composition may be selected to mimic known PEDOT:PSS compositions in terms of conductivity etc. The polyethylene glycol may then be cross-linked by, for example, heating to provide a solid polyelectrolyte for the ionic dopant. Suitable dopants may include lithium halides or lithium triflimide. The process is summarized below:

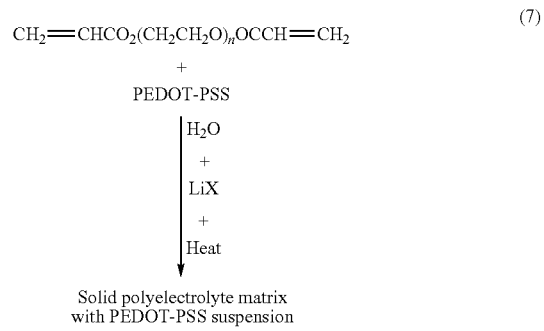

This embodiment provides a polyethylene glycol matrix which is optionally cross-linked. Cross-linking improves the Tg of the matrix and makes the matrix more robust so it doesn't react with the next layer. PEG is a very stable medium, is water soluble, and can very effectively complex with cations (particularly lithium) so as to provide a solid polyelectrolyte. Accordingly PEG is mixed with the salt to provide a conductive matrix. Lithium is effectively solvated by PEG and can move within the matrix.

The lithium ion —PEG matrix supports ionic conduction without the need for excess hydrogen ions. The solid state polyelectrolyte thus substitutes for hydrogen ion mobility without the possible problems of etching ITO with the release of ITO into PEDOT causing degradation. That is, ionic conductivity is controlled without relying on protonic conduction. Rather, an alternative ion transporter may be provided. Accordingly, embodiments of the present invention mimic the conductivity of PEDOT:PSS with excess PSS without the need for excess PSS. Only sufficient PSS to stabilize the polymer cation is required in order to retain radical conduction. The excess PSS providing ionic conduction is replaced with the solid electrolyte. According to some embodiments all the PSS may be replaced. Alternative conductive polymers to PEDOT are also envisaged. The above description of the invention has been with reference to PSS as a counterion to PEDOT, however it will be appreciated that alternative polyanions may be used in place of PSS—for example WO 04/029128 discloses the fluorinated sulfonic acid Nafion® for use with PEDOT.

The presently proposed conductive polymer composition can be tuned with regard to conductivity by changing the matrix and/or the salt so as to change the strength of interaction between the matrix and salt ions thus changing conductivity. However, it is desirable that the matrix be water soluble which can limit the types of material which may be used as a matrix. PEG is a classical solid electrolyte.

According to a further aspect of the present invention, a conductive polymer composition comprising a conductive polymer in a solid polyelectrolyte is provided in a form particularly suited for deposition by ink jet printing techniques.

In this further aspect, the solid polyelectrolyte may comprise polyethylene glycol. The inventors of the present invention have found that an addition of polyethylene can glycol assist in ink jet printing of the conductive polymer by, for example, mitigating clogging of the ink jet dispenser. Without being bound by theory, it is considered that the effect arises because of the polar nature of polyethylene glycol. Additionally, the performance of ink jetting can be aided through an ability to control properties such as the resultant viscosity of the conductive polymer.

The viscosity of the composition may be in the range 2 to 30 mPa, 2 to 20 mPA, 4 to 12 mPA, more preferably 6 to 8 mPa, and most preferably approximately 8 mPa at 20 degrees Centigrade.

Additionally, the composition may comprise a surfactant. The surfactant may be present in the range 0.1-5%, 0.5-3% or 1-2% by volume. A typical surfactant may be a glycol ether.

In a yet further aspect, the invention provides a conductive polymer composition comprising a conductive polymer and a non-ionic, non-volatile polar diluent.

Preferably, the conductive polymer comprises PEDOT and a charge balancing counterion, preferably a polyanion, more preferably a poly(sulfonic acid).

A particularly preferred poly(sulfonic acid) is PSS.

Preferably, the diluent comprises a polyether, more preferably an optionally substituted poly(ethylene glycol).

The polar nature of the diluent renders the diluent soluble in polar solvents, for example water.

The diluent does not comprise acid groups, in particular carboxylic acid or sulfonic acid groups.

Preferably, the diluent has a pH>2, preferably a pH>3.

The diluent can serve to modify both the solution processing properties and the resistivity of the composition. Preferably, the resistivity of the composition is in the range from 1 Ohm.cm up to less than $10^6$ Ohms.cm.

In use, a solution such as an aqueous solution of the composition is deposited followed by a step of solvent evaporation. It will be understood that the diluent does not evaporate during the solvent evaporation step, and the term "non-volatile" should be construed accordingly.

The addition of polyethylene glycol enables the resistivity of the conductive polymer to be tuned to a desired value. Preferably, polyethylene glycol having a molecular weight of 250 is added to a PEDOT composition in the range 0 to 3% concentration by weight, preferably 1 to 3%, more preferably, 1 to 2%, most preferably less than or equal to 1.5% and very preferably less then 1.25%.

The polyethylene glycol is preferably a polyethylene glycol having a number average molecular weight (Mn) of 250, 1K or 2K. A 1K and 2K polyethylene glycol enable a thicker, more viscous solution to be prepared, which is beneficial for ink jet printing application.

The polyethylene glycol is preferably a polyethylene glycol dimethyl ether (i.e. end-capped with methoxy groups) and may be added to various formulations of PEDOT at various ratios of PEDOT:PSS. Various formulations of PEDOT in various ratios of PEDOT:PSS are available from H C Stark and various formulations of polyethylene glycol are available from Sigma-Aldrich.

Referring to FIG. 3, a graph of % concentration by weight of 250 polyethylene glycol against resistivity (Ohms/cm) is shown. The graph illustrates an increase in the resistivity of the conductive polymer as increased concentrations of polyethylene glycol are added to the conductive polymer composition of the present invention until the % concentration reaches around 1%, whereupon the resistivity falls sharply.

The results for 250 polyethylene glycol are included in Table 1 below:

TABLE 1

| % Concentration of Polyethylene Glycol | Resistivity (Ohm · cm) |
|---|---|
| 0 | 5900 |
| 0.25 | 7500 |
| 0.5 | 16700 |
| 1 | 21400 |

TABLE 1-continued

| % Concentration of Polyethylene Glycol | Resistivity (Ohm · cm) |
|---|---|
| 2 | 550 |
| 4 | 25 |
| 5 | 24 |

The results for 0.25K PEG, 1K PEG and 2K PEG within a PEDOT:PSS composition are included in Table 2 below:

TABLE 2

| PEDOT/PSS including: | Resistivity Ohms · cm |
|---|---|
| 1% 2K PEG | 11 700 |
| 5% 2K PEG | 29 |
| 1% 1K PEG | 10 100 |
| 5% 1K PEG | 33 |
| 1% 0.25K PEG | 21080 |
| 5% 0.25K PEG | 24 |
| 15% 0.25K PEG | 22 |

According to a further aspect of the present invention therefore, a PEDOT composition comprising polyethylene glycol is provided. The PEDOT composition may comprise a counter ion, preferably PSS.

Preferably, a concentration by weight of the polyethylene glycol is provided such that the resistivity of the PEDOT composition is greater than 1 Ohm.cm and less than $10^6$ Ohms.cm.

Additionally, a method of manufacturing an opto-electrical device comprising ink jet printing a PEDOT composition comprising a concentration by weight of polyethylene glycol such that the resistivity of the composition is in the range of greater than 1 Ohm.cm and less than $10^6$ Ohm.cm is also provided.

Moreover, a method of manufacturing an organic light-emissive display comprising: providing a substrate comprising a first electrode layer and a bank structure defining a plurality of wells; depositing a conductive organic layer over the first electrode; depositing a second electrode over the organic light-emissive layer, wherein the conductive organic layer is deposited by ink jet printing a composition as described above is also provided.

It is envisaged that conductive polymer compositions of the present invention may be used in an electrical device, particularly an opto-electronic device, as a hole injection material, an electron transport material or as an anode if the composition is tuned for high conductivity. A preferred opto-electronic device comprises an organic light emitting device (OLED). It is also envisaged that the conductive polymer compositions of the present invention may be used in capacitors and as anti-static coatings on lenses.

BRIEF DESCRIPTION OF THE DRAWINGS

Embodiments of the present invention will now be described by way of example only with reference to the accompanying drawing in which.

DETAILED DESCRIPTION OF EMBODIMENTS OF THE INVENTION

Figure 1:
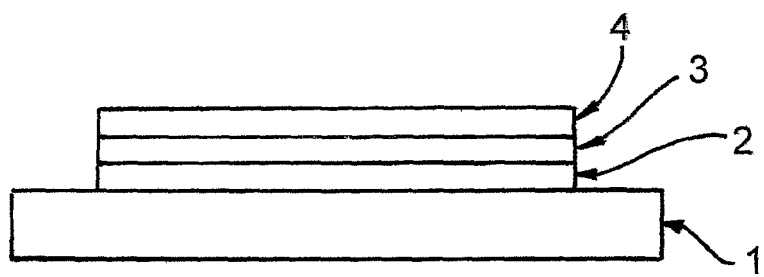
FIG. 1 shows an organic light emitting device according to an embodiment of the present invention.

The device shown in FIG. 1 comprises a transparent glass or plastic substrate 1, an anode 2 of indium tin oxide and a cathode 4. An electroluminescent layer 3 is provided between anode 2 and cathode 4.

Further layers may be located between anode 2 and cathode 3, such as charge transporting, charge injecting or charge blocking layers.

In accordance with an embodiment of the present invention, a conductive hole injection layer formed of a conductive polymer composition is located between the anode 2 and the electroluminescent layer 3 to assist hole injection from the anode into the layer or layers of semiconducting polymer.

Figure 2:
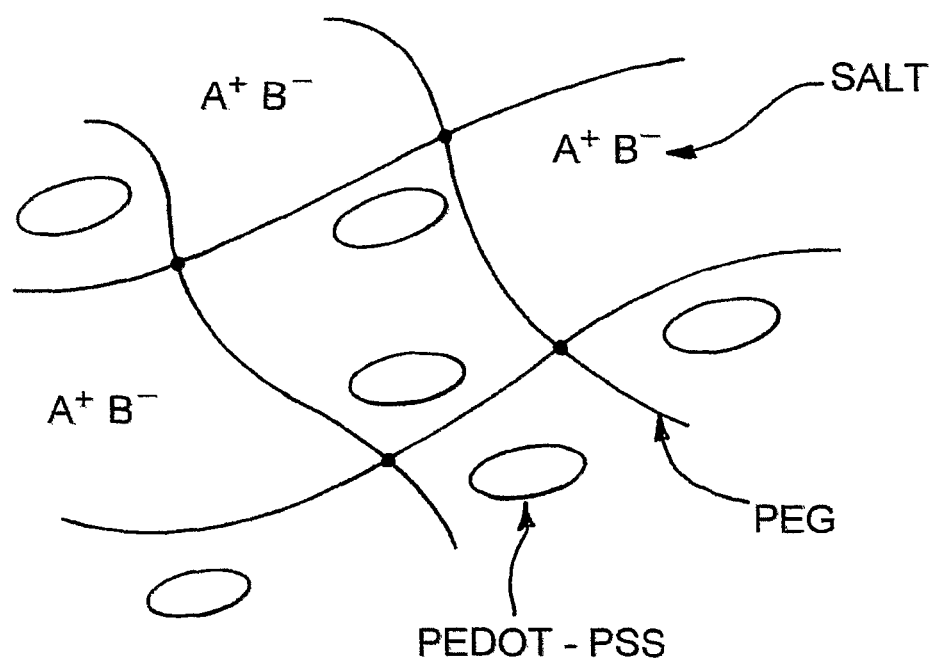
FIG. 2 shows a schematic diagram of a conductive polymer composition according to an embodiment of the present invention.
Figure 3:
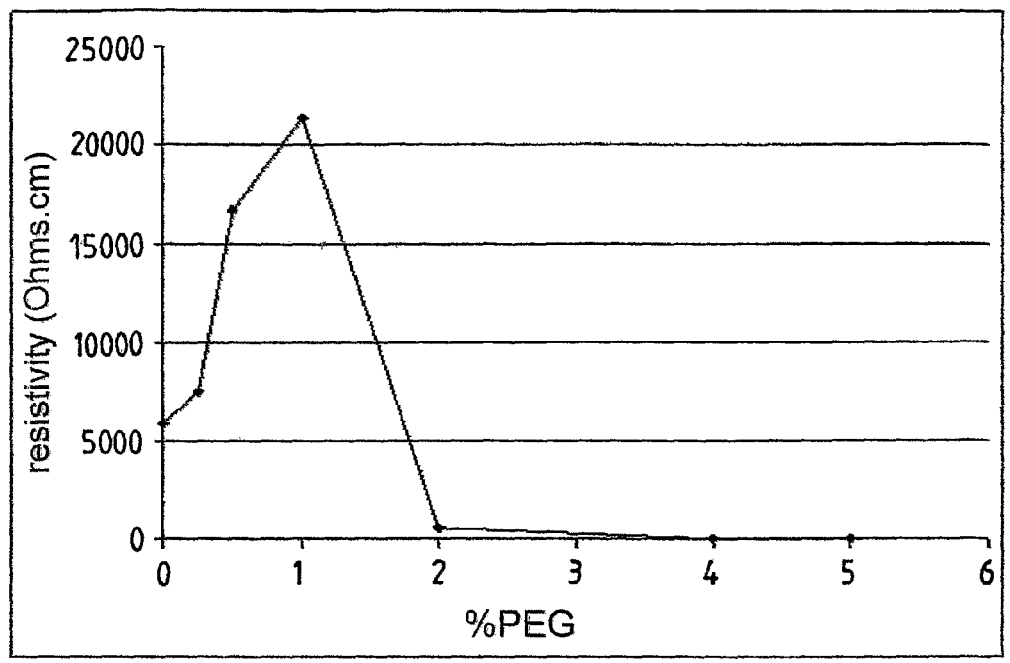
FIG. 3 shows a graph of % concentration of polyethylene glycol against resistivity of a conductive polymer according to the present invention.
Figure 3:
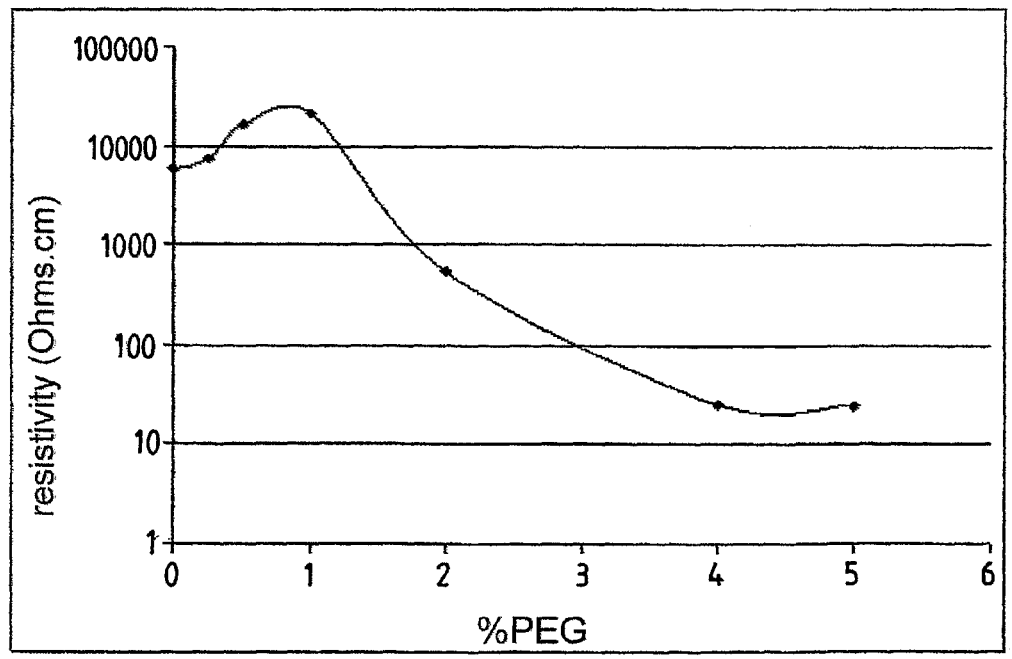

The hole injection layer may be made by mixing PEDOT:PSS at a ratio of 1:2.5 with PEG and lithium triflimide in water. The resultant composition may be spin coated or ink jet printed to form a layer on the anode. The layer may then be heated to thermally cross-link the polyelectrolyte matrix after deposition. A schematic diagram illustrated the structure of the resultant composition is shown in FIG. 2.

The hole injection layer located between anode 2 and electroluminescent layer 3 preferably has a HOMO level of less than or equal to 5.5 eV, more preferably around 4.8-5.5 eV.

If present, an electron transporting layer located between electroluminescent layer 3 and cathode 4 preferably has a LUMO level of around 3-3.5 eV.

Electroluminescent layer 3 may consist of the electroluminescent material alone or may comprise the electroluminescent material in combination with one or more further materials. In particular, the electroluminescent material may be blended with hole and/or electron transporting materials as disclosed in, for example, WO 99/48160. Alternatively, the electroluminescent material may be covalently bound to a charge transporting material.

Cathode 4 is selected from materials that have a workfunction allowing injection of electrons into the electroluminescent layer. Other factors influence the selection of the cathode such as the possibility of adverse interactions between the cathode and the electroluminescent material. The cathode may consist of a single material such as a layer of aluminium. Alternatively, it may comprise a plurality of metals, for example a bilayer of calcium and aluminium as disclosed in WO 98/10621, elemental barium disclosed in WO 98/57381, Appl. Phys. Lett. 2002, 81(4), 634 and WO 02/84759 or a thin layer of dielectric material to assist electron injection, for example lithium fluoride disclosed in WO 00/48258 or barium fluoride, disclosed in Appl. Phys. Lett. 2001, 79(5), 2001. In order to provide efficient injection of electrons into the device, the cathode preferably has a workfunction of less than 3.5 eV, more preferably less than 3.2 eV, most preferably less than 3 eV.

Optical devices tend to be sensitive to moisture and oxygen. Accordingly, the substrate preferably has good barrier properties for prevention of ingress of moisture and oxygen into the device. The substrate is commonly glass, however alternative substrates may be used, in particular where flexibility of the device is desirable. For example, the substrate may comprise a plastic as in U.S. Pat. No. 6,268,695 which discloses a substrate of alternating plastic and barrier layers or a laminate of thin glass and plastic as disclosed in EP 0949850.

The device is preferably encapsulated with an encapsulant (not shown) to prevent ingress of moisture and oxygen. Suitable encapsulants include a sheet of glass, films having suitable barrier properties such as alternating stacks of polymer and dielectric as disclosed in, for example, WO 01/81649 or an airtight container as disclosed in, for example, WO 01/19142. A getter material for absorption of any atmospheric moisture and/or oxygen that may permeate through the substrate or encapsulant may be disposed between the substrate and the encapsulant.

In a practical device, at least one of the electrodes is semi-transparent in order that light may be absorbed (in the case of a photoresponsive device) or emitted (in the case of an OLED). Where the anode is transparent, it typically comprises indium tin oxide. Examples of transparent cathodes are disclosed in, for example, GB 2348316.

The embodiment of FIG. 1 illustrates a device wherein the device is formed by firstly forming an anode on a substrate followed by deposition of an electroluminescent layer and a cathode. However it will be appreciated that the device of the invention could also be formed by firstly forming a cathode on a substrate followed by deposition of an electroluminescent layer and an anode.

Various polymers are useful as emitters and/or charge transporters. Some examples of these are given below. The repeat units discussed below may be provided in a homopolymer, in a blend of polymers and/or in copolymers. It is envisaged that conductive polymer compositions according to embodiments of the present invention may be used with any such combination. In particular, conductive polymer layers of the present invention may be tuned in relation to the particular emissive and charge transport layers utilized in a device in order to obtain a desired conductivity, HOMO and LUMO.

Polymers may comprise a first repeat unit selected from arylene repeat units, in particular: 1,4-phenylene repeat units as disclosed in J. Appl. Phys. 1996, 79, 934; fluorene repeat units as disclosed in EP 0842208; indenofluorene repeat units as disclosed in, for example, Macromolecules 2000, 33(6), 2016-2020; and spirofluorene repeat units as disclosed in, for example EP 0707020. Each of these repeat units is optionally substituted. Examples of substituents include solubilising groups such as $C_{1-20}$ alkyl or alkoxy; electron withdrawing groups such as fluorine, nitro or cyano; and substituents for increasing glass transition temperature (Tg) of the polymer.

Particularly preferred polymers comprise optionally substituted, 2,7-linked fluorenes, most preferably repeat units of formula (8):

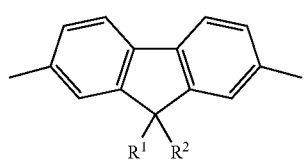

(8)

wherein $R^1$ and $R^2$ are independently selected from hydrogen or optionally substituted alkyl, alkoxy, aryl, arylalkyl, heteroaryl and heteroarylalkyl. More preferably, at least one of $R^1$ and $R^2$ comprises an optionally substituted $C_4$-$C_{20}$ alkyl or aryl group.

A polymer comprising the first repeat unit may provide one or more of the functions of hole transport, electron transport and emission depending on which layer of the device it is used in and the nature of co-repeat units.

A homopolymer of the first repeat unit, such as a homopolymer of 9,9-dialkylfluoren-2,7-diyl, may be utilised to provide electron transport.

A copolymer comprising a first repeat unit and a triarylamine repeat unit may be utilised to provide hole transport and/or emission.

Particularly preferred hole transporting polymers of this type are AB copolymers of the first repeat unit and a triarylamine repeat unit.

A copolymer comprising a first repeat unit and heteroarylene repeat unit may be utilised for charge transport or emission. Preferred heteroarylene repeat units are selected from formulae 9-23:

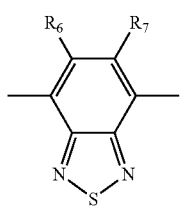

9 wherein $R_6$ and $R_7$ are the same or different and are each independently hydrogen or a substituent group, preferably alkyl, aryl, perfluoroalkyl, thioalkyl, cyano, alkoxy, heteroaryl, alkylaryl or arylalkyl. For ease of manufacture, $R_6$ and $R_7$ are preferably the same. More preferably, they are the same and are each a phenyl group.

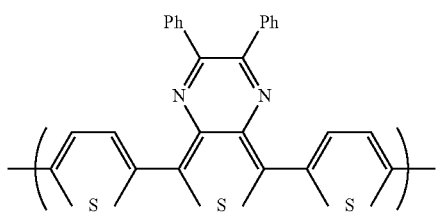

10

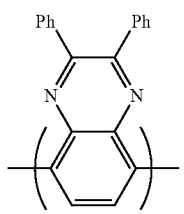

11

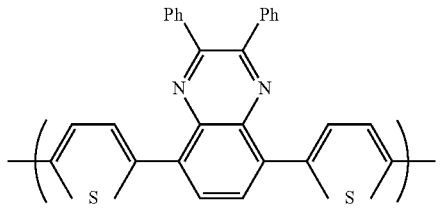

12

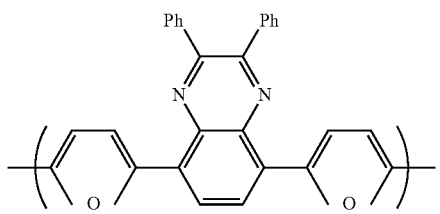

13

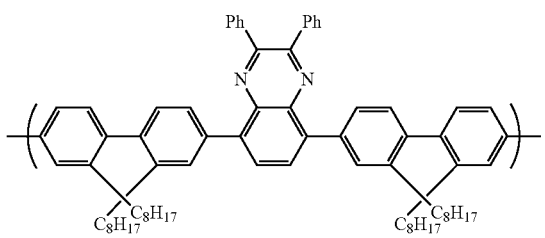

14

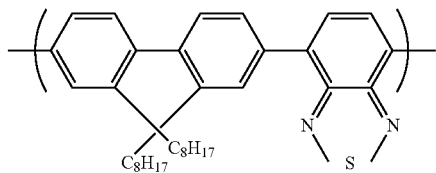

15

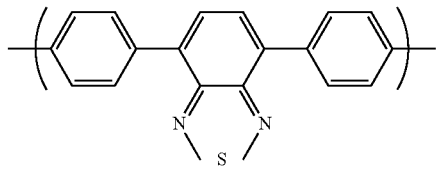

16

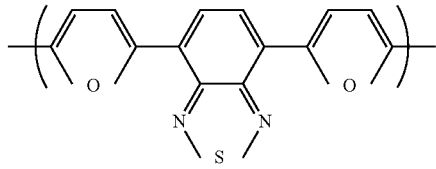

17

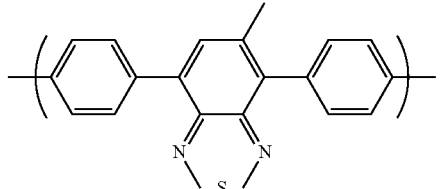

18

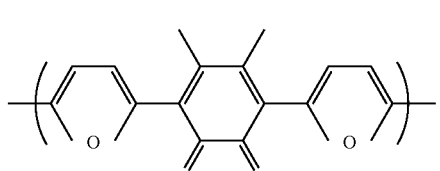

19

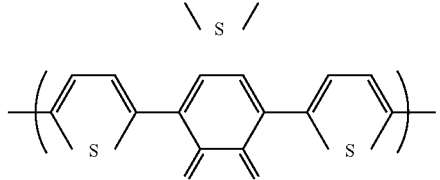

20

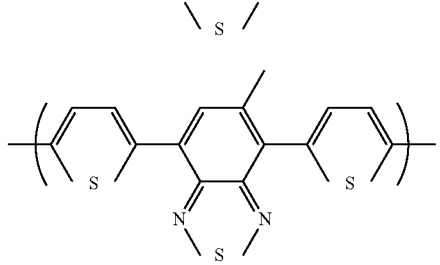

21

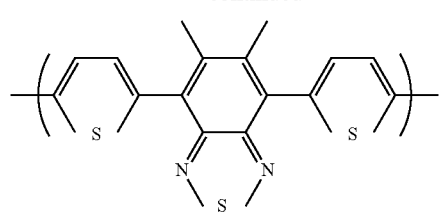

22

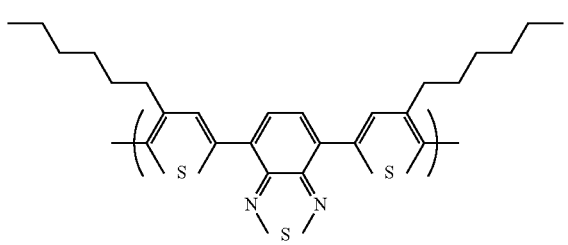

23

Electroluminescent copolymers may comprise an electroluminescent region and at least one of a hole transporting region and an electron transporting region as disclosed in, for example, WO 00/55927 and U.S. Pat. No. 6,353,083. If only one of a hole transporting region and electron transporting region is provided then the electroluminescent region may also provide the other of hole transport and electron transport functionality.

The different regions within such a polymer may be provided along the polymer backbone, as per U.S. Pat. No. 6,353,083, or as groups pendent from the polymer backbone as per WO 01/62869.

Preferred methods for preparation of these polymers are Suzuki polymerisation as described in, for example, WO 00/53656 and Yamamoto polymerisation as described in, for example, T. Yamamoto, "Electrically Conducting And Thermally Stable π-Conjugated Poly(arylene)s Prepared by Organometallic Processes", Progress in Polymer Science 1993, 17, 1153-1205. These polymerisation techniques both operate via a "metal insertion" wherein the metal atom of a metal complex catalyst is inserted between an aryl group and a leaving group of a monomer. In the case of Yamamoto polymerisation, a nickel complex catalyst is used; in the case of Suzuki polymerisation, a palladium complex catalyst is used.

For example, in the synthesis of a linear polymer by Yamamoto polymerisation, a monomer having two reactive halogen groups is used. Similarly, according to the method of Suzuki polymerisation, at least one reactive group is a boron derivative group such as a boronic acid or boronic ester and the other reactive group is a halogen. Preferred halogens are chlorine, bromine and iodine, most preferably bromine.

It will therefore be appreciated that repeat units and end groups comprising aryl groups as illustrated throughout this application may be derived from a monomer carrying a suitable leaving group.

Suzuki polymerisation may be used to prepare regioregular, block and random copolymers. In particular, homopolymers or random copolymers may be prepared when one reactive group is a halogen and the other reactive group is a boron derivative group. Alternatively, block or regioregular, in particular AB, copolymers may be prepared when both reactive groups of a first monomer are boron and both reactive groups of a second monomer are halogen.

As alternatives to halides, other leaving groups capable of participating in metal insertion include tosylate, mesylate, phenyl sulfonate and triflate.

A single polymer or a plurality of polymers may be deposited from solution to form layer 5. Suitable solvents for polyarylenes, in particular polyfluorenes, include mono- or poly-alkylbenzenes such as toluene and xylene. Particularly preferred solution deposition techniques are spin-coating and inkjet printing.

Spin-coating is particularly suitable for devices wherein patterning of the electroluminescent material is unnecessary—for example for lighting applications or simple monochrome segmented displays.

Inkjet printing is particularly suitable for high information content displays, in particular full colour displays. Inkjet printing of OLEDs is described in, for example, EP 0880303.

If multiple layers of the device are formed by solution processing then the skilled person will be aware of techniques to prevent intermixing of adjacent layers, for example by crosslinking of one layer before deposition of a subsequent layer or selection of materials for adjacent layers such that the material from which the first of these layers is formed is not soluble in the solvent used to deposit the second layer.

Alternatively, one layer is preferably formed by deposition from solution followed by heat treatment in order to render it substantially insoluble in the solvent used for deposition for a subsequent layer. In this way, cross-linking may be avoided.

Phosphorescent materials are also useful and in some applications may be preferable to fluorescent materials. One type of phosphorescent material comprises a host and a phosphorescent emitter in the host. The emitter may be bonded to the host or provided as a separate component in a blend.

Numerous hosts for phosphorescent emitters are described in the prior art including "small molecule" hosts such as 4,4'-bis(carbazol-9-yl)biphenyl), known as CBP, and (4,4',4"-tris(carbazol-9-yl)triphenylamine), known as TCTA, disclosed in Ikai et al. (*Appl. Phys. Lett.,* 79 no. 2, 2001, 156); and triarylamines such as tris-4-(N-3-methylphenyl-N-phenyl)phenylamine, known as MTDATA. Homopolymers are also known as hosts, in particular poly(vinyl carbazole) disclosed in, for example, Appl. Phys. Lett. 2000, 77(15), 2280; polyfluorenes in Synth. Met. 2001, 116, 379, Phys. Rev. B 2001, 63, 235206 and Appl. Phys. Lett. 2003, 82(7), 1006; poly[4-(N-4-vinylbenzyloxyethyl, N-methylamino)-N-(2,5-di-tert-butylphenylnapthalimide] in Adv. Mater. 1999, 11(4), 285; and poly(para-phenylenes) in J. Mater. Chem. 2003, 13, 50-55.

Preferred phosphorescent metal complexes comprise optionally substituted complexes of formula (24):

$$ML^1_q L^2_r L^3_s \qquad (24)$$

wherein M is a metal; each of $L^1$, $L^2$ and $L^3$ is a coordinating group; q is an integer; r and s are each independently 0 or an integer; and the sum of (a. q)+(b. r)+(c.s) is equal to the number of coordination sites available on M, wherein a is the number of coordination sites on $L^1$, b is the number of coordination sites on $L^2$ and c is the number of coordination sites on $L^3$.

Heavy elements M induce strong spin-orbit coupling to allow rapid intersystem crossing and emission from triplet states (phosphorescence). Suitable heavy metals M include:
lanthanide metals such as cerium, samarium, europium, terbium, dysprosium, thulium, erbium and neodymium; and
d-block metals, in particular those in rows 2 and 3 i.e. elements 39 to 48 and 72 to 80, in particular ruthenium, rhodium, palladium, rhenium, osmium, iridium, platinum and gold.

Suitable coordinating groups for the f-block metals include oxygen or nitrogen donor systems such as carboxylic acids, 1,3-diketonates, hydroxy carboxylic acids, Schiff bases including acyl phenols and iminoacyl groups. As is known, luminescent lanthanide metal complexes require sensitizing group(s) which have the triplet excited energy level higher than the first excited state of the metal ion. Emission is from an f-f transition of the metal and so the emission colour is determined by the choice of the metal. The sharp emission is generally narrow, resulting in a pure colour emission useful for display applications.

The d-block metals form organometallic complexes with carbon or nitrogen donors such as porphyrin or bidentate ligands of formula (25):

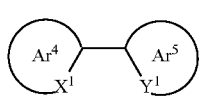

(25)

wherein $Ar^4$ and $Ar^5$ may be the same or different and are independently selected from optionally substituted aryl or heteroaryl; $X^1$ and $Y^1$ may be the same or different and are independently selected from carbon or nitrogen; and $Ar^4$ and $Ar^5$ may be fused together. Ligands wherein $X^1$ is carbon and $Y^1$ is nitrogen are particularly preferred. Examples of bidentate ligands are illustrated below:

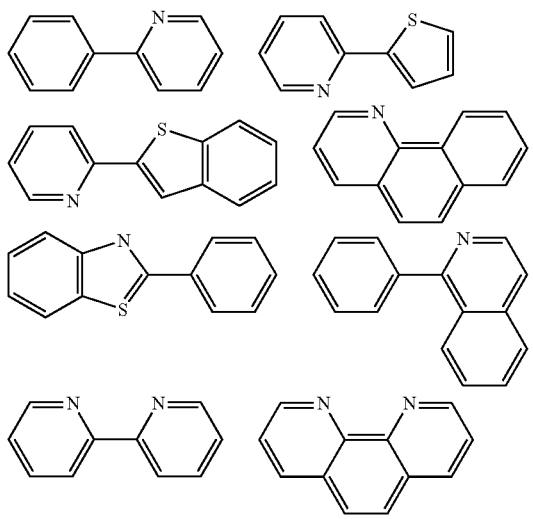

Each of $Ar^4$ and $Ar^5$ may carry one or more substituents. Particularly preferred substituents include fluorine or trifluoromethyl which may be used to blue-shift the emission of the complex as disclosed in WO 02/45466, WO 02/44189, US 2002-117662 and US 2002-182441; alkyl or alkoxy groups as disclosed in JP 2002-324679; carbazole which may be used to assist hole transport to the complex when used as an emissive material as disclosed in WO 02/81448; bromine, chlorine or iodine which can serve to functionalise the ligand for attachment of further groups as disclosed in WO 02/68435 and EP 1245659; and dendrons which may be used to obtain or enhance solution processability of the metal complex as disclosed in WO 02/66552.

Other ligands suitable for use with d-block elements include diketonates, in particular acetylacetonate (acac); triarylphosphines and pyridine, each of which may be substituted.

Main group metal complexes show ligand based, or charge transfer emission. For these complexes, the emission colour is determined by the choice of ligand as well as the metal.

The host material and metal complex may be combined in the form of a physical blend. Alternatively, the metal complex may be chemically bound to the host material. In the case of a polymeric host, the metal complex may be chemically bound as a substituent attached to the polymer backbone, incorporated as a repeat unit in the polymer backbone or provided as an end-group of the polymer as disclosed in, for example, EP 1245659, WO 02/31896, WO 03/18653 and WO 03/22908.

Such host-emitter systems are not limited to phosphorescent devices. A wide range of fluorescent low molecular weight metal complexes are known and have been demonstrated in organic light emitting devices [see, e.g., Macromol. Sym. 125 (1997) 1-48, U.S. Pat. Nos. 5,150,006, 6,083,634 and 5,432,014].

A wide range of fluorescent low molecular weight metal complexes may be used with the present invention. A preferred example is tris-(8-hydroxyquinoline)aluminium. Suitable ligands for di or trivalent metals include: oxinoids, e.g. with oxygen-nitrogen or oxygen-oxygen donating atoms, generally a ring nitrogen atom with a substituent oxygen atom, or a substituent nitrogen atom or oxygen atom with a substituent oxygen atom such as 8-hydroxyquinolate and hydroxyquinoxalinol-10-hydroxybenzo (h) quinolinato (II), benzazoles (III), schiff bases, azoindoles, chromone derivatives, 3-hydroxyflavone, and carboxylic acids such as salicylato amino carboxylates and ester carboxylates. Optional substituents include halogen, alkyl, alkoxy, haloalkyl, cyano, amino, amido, sulfonyl, carbonyl, aryl or heteroaryl on the (hetero) aromatic rings which may modify the emission colour.

The present invention provides conductive polymer compositions which do not degrade the above-described components of opto-electrical devices. Furthermore the conductive polymer compositions of the present invention can be tuned according to the desired properties of the composition and the resultant device. In particular, the conductive polymer compositions can be tuned according to which of the above-described components are included in the device in order to optimise performance.

While this invention has been particularly shown and described with reference to preferred embodiments thereof, it will be understood by those skilled in the art that various changes in form and details may be made therein without departing from the scope of the invention as defined by the appended claims.

The invention claimed is:

1. A conductive polymer composition comprising a conductive polymer in a solid polyelectrolyte, wherein the polyelectrolyte comprises a polymer matrix and ions selected to diffuse through the polymer matrix to provide ionic conductance, wherein the conductive polymer comprises a conductive polymer ion and wherein the conductive polymer composition further comprises a counter ion and wherein the counter ion is a polymer.

2. A conductive polymer composition according to claim 1, wherein the conductive polymer ion is a cation and the counter ion is an anion.

3. A conductive polymer composition according to claim 2, wherein the counter ion is an anion of a strong acid.

4. A conductive polymer composition according to claim 3, wherein the counter ion is an anion of polystyrene sulphonic acid.

5. A conductive polymer composition according to claim 2, wherein the conductive polymer ion is a cation of polyethylene dioxythiophene.

6. A conductive polymer composition according to claim 1, wherein the ratio of conductive polymer ion: counter ion is less than 1:10.

7. A conductive polymer composition according to claim 6, wherein the ratio of conductive polymer ion: counter ion is less than 1:5.

8. A conductive polymer composition according to claim 7, wherein the ratio of conductive polymer ion: counter ion is less than 1:2.5.

9. A conductive polymer composition according to claim 8, wherein the ratio of conductive polymer ion: counter ion is less than 1:2.

10. A conductive polymer composition according to claim 9, wherein at least one of the conductive polymer and the solid polyelectrolyte is soluble in water.

11. A conductive polymer composition according to claim 9, wherein the solid polyelectrolyte comprises a salt.

12. A conductive polymer composition according to claim 11, wherein the salt is a salt of a group 1 metal, a group 2 metal, a d-block metal, a lanthanide or an actinide.

13. A conductive polymer composition according to claim 12, wherein the salt is a salt of a group 1 metal or a group 2 metal.

14. A conductive polymer composition according to claim 13, wherein the salt is a salt of sodium or lithium.

15. A conductive polymer composition according to claim 14, wherein the salt is a salt of lithium.

16. A conductive polymer composition according to claim 9 wherein the solid polyelectrolyte comprises polyethylene glycol.

17. A conductive polymer composition according to claim 9, wherein the cross-linkable polymer matrix is crosslinked to form the solid polyelectrolyte.

18. A conductive polymer composition according claim 9, wherein the conductive polymer has a work function less than or equal to 5.5 eV.

19. A conductive polymer composition according to claim 9, wherein the conductive polymer has a work function in the range 4.8-5.5 eV.

20. An electrical device comprising a conductive polymer composition according to claim 1.

21. An electrical device according to claim 20, comprising an anode, a cathode, and an organic semi-conductive layer between the anode and cathode.

22. An electrical device according to claim 21, wherein the conductive polymer composition is provided in a layer between the anode and cathode.

23. An electrical device according to claim 22, wherein the layer comprising the conductive polymer composition is located between the anode and the organic semi-conductive layer.

24. An electrical device according to claim 21, wherein the organic semi-conductive layer is light-emissive.

25. An electrical device according to claim 21, wherein the anode comprises indium tin oxide (ITO).

26. An electrical device according to claim 21, wherein the organic semi-conductive layer comprises at least one of a hole transporter, an electron transporter and a light emissive material.

27. An electrical device according to claim 21, wherein at least one further organic semi-conductive layer is provided between the anode and cathode.

28. An electrical device according to claim 21, wherein at least one of the anode and the cathode independently comprise the conductive polymer composition.

29. A method of manufacturing an electrical device according to claim 20, comprising depositing the conductive polymer composition by spin coating or ink jet printing.

30. A method according to claim 29, comprising depositing the conductive polymer composition in an aqueous solution.

31. A method according to claim 29, comprising heating the composition after the composition is deposited so as to cross-link the polyelectrolyte.

32. A method according to claim 31, comprising performing the heating step prior to deposition of an overlying layer.

33. A conductive polymer composition comprising a conductive polymer in a solid polyelectrolyte, wherein the polyelectrolyte comprises a polymer matrix and ions selected to diffuse through the polymer matrix to provide ionic conductance, wherein the polyelectrolyte comprises a polyethylene glycol and a salt of a group 1 metal or a group 2 metal, and the conductive polymer comprises a cation of polyethylene dioxythiophene and a counter anion.

34. A conductive polymer composition according to claim 33, wherein the polyethylene glycol is polyethylene glycol dimethyl ether.

35. A conductive polymer composition according to claim 34, wherein the counter anion is an anion of polystyrene sulphonic acid.

* * * * *